UNITED STATES PATENT OFFICE.

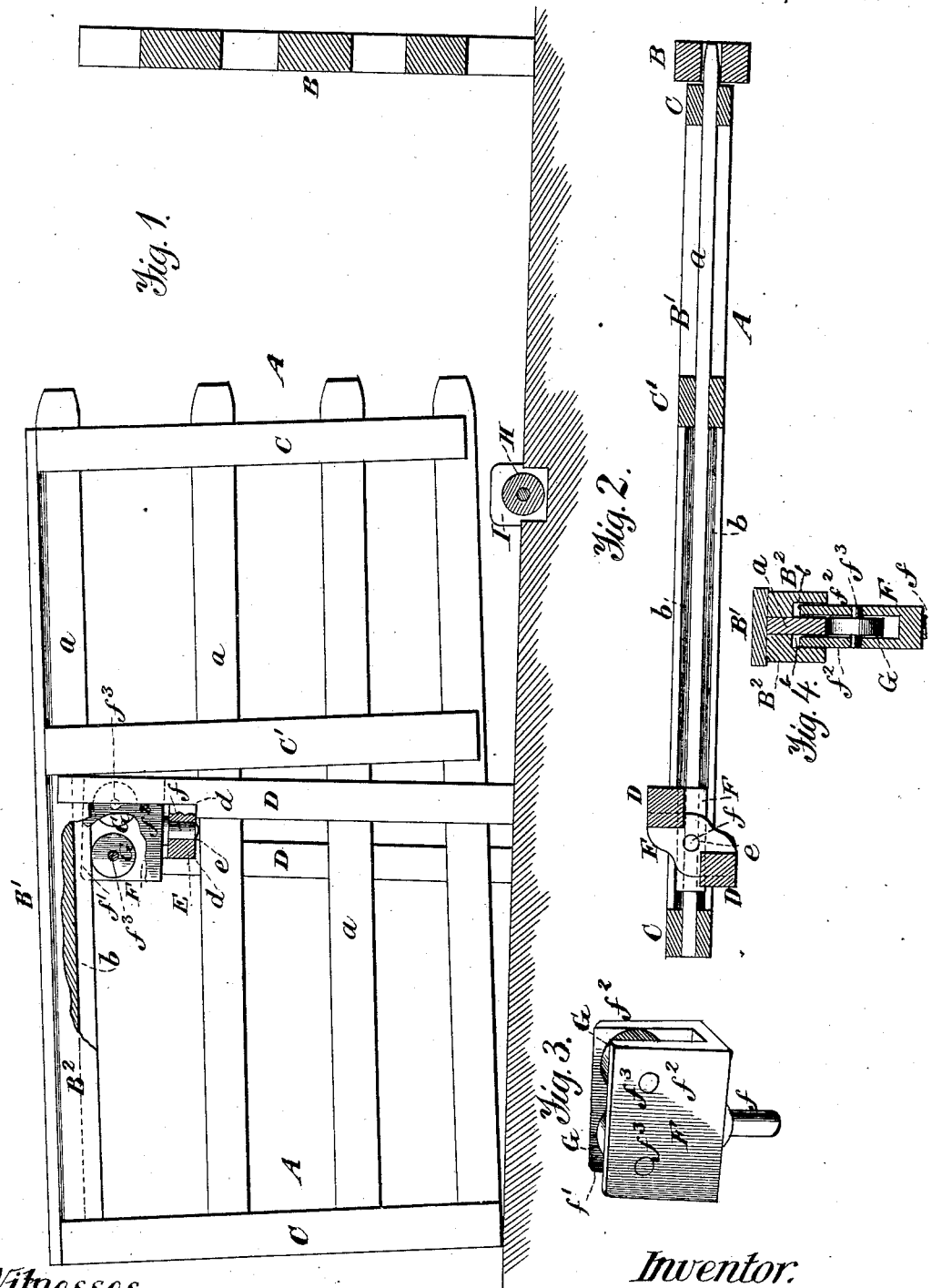

GEORGE BRESSLER, OF HUNTINGTON, INDIANA.

SWINGING AND ROLLING FARM-GATE.

SPECIFICATION forming part of Letters Patent No. 333,915, dated January 5, 1886.

Application filed April 9, 1885. Serial No. 161,734. (No model.)

*To all whom it may concern:*

Be it known that I, GEORGE BRESSLER, of Huntington, in the county of Huntington and State of Indiana, have invented an Improved Swinging and Rolling Farm-Gate, of which the following is a specification.

The special object of the invention is to make a gate which rolls back on a rear hinge until it is balanced thereon, and then, with a very slight exertion of force, is turned at right angles to the gate-posts; also, to protect the rollers and hinge from exposure to moisture, so that the joints will not be clogged and jammed with ice in cold weather.

Figure 1 of the drawings is a side elevation showing the gate after it has been run back and is balanced on its hinge. Fig. 2 is a horizontal section showing from a bottom view the upper flanges of the hinge and the guide-grooves in the upper rail of the gate. Fig. 3 is a detail view of the hinge, showing its peculiarities of construction. Fig. 4 is a cross-section of Fig. 3.

In the drawings, A represents the gate, which I preferably make about eighteen feet long, so as to allow a self-binding harvester to pass readily therethrough. It consists of the usual rails, $a$, which in front project so as to run into the holes or mortises of the post B, and the uprights C, to which said rails are made fast. One peculiarity of my gate will here be noticed—that the intermediate upright, C', is not in the middle of the gate, for a reason hereinafter explained.

On the top rail I place a horizontal board or plank, B', and between the upright C' and rear upright, C, I arrange on each side of the top rail, and at a little distance therefrom, the parallel planks B² B², thus forming the grooves $b\ b$.

D D represent two rear gate-posts, which are at such a distance apart as to allow plenty of room for the gate when closed or open. These two posts are connected near the top by a transverse step-bearing, E, which is supported on corresponding shoulders, $d\ d$. The pivot-hole $e$ is so placed as to be at the intersection of the vertical planes in which the gate stands when closed and when open.

F is the single hinge which I propose to employ with farm-gates, and whose construction is peculiar and adapted to a double purpose—namely, to carry the hinge pintle and rollers on which the gate rests and is balanced before it is swung open. It is provided on the lower side with a journal or pivot, $f$, and has an open and longitudinal top slot, $f'$, formed by the two equal and parallel vertical flanges $f^2 f^2$. The latter fit loosely in the grooves $b\ b$, but do not extend upwardly a sufficient distance to strike the roof-board B', which protects the hinge, with its rollers, from rain or snow. Across the flanges $f^2 f^2$ are arranged the fixed pivots $f^3 f^3$, upon which turn the friction-rollers G G. The top rail rests upon these rollers, and the gate is by them supported, so that it may be easily moved back until the upright C' strikes the hinge, when one-half the weight of the gate will be borne by each roller, said gate being thus nicely balanced above the bottom roller, H, and guides I I. In this position the slightest pressure will cause the gate to turn with its hinges until it is wide open.

I am aware that it is not new to move back a gate longitudinally on one or two rolls until it is upon a balance, and then turn it laterally upon a pivot in order to open it; but

What I claim, and seek to protect by Letters Patent, is—

In a rolling and swinging gate, the combination of a top rail having subjacent grooves $b\ b$, a hinge, F, having top flanges which work in said grooves, one or more rolls arranged between said flanges, and two diagonally-arranged posts D D, connected by a step-bearing, E, that receives the hinge-pintle $f$, all as shown and described.

GEORGE BRESSLER.

Witnesses:
D. C. ANDERSON,
J. L. COBB.